US012586958B2

(12) United States Patent
Huang et al.

(10) Patent No.: US 12,586,958 B2
(45) Date of Patent: Mar. 24, 2026

(54) ELECTRICAL CONNECTOR WITH IMPROVED SHIELDING FEATURES

(71) Applicant: DONGGUAN LUXSHARE TECHNOLOGIES CO., LTD, Dongguan (CN)

(72) Inventors: Bin Huang, Dongguan (CN); Hongji Chen, Dongguan (CN); Kunlin Yao, Dongguan (CN); Chuanqi Gong, Dongguan (CN); Chenhui Zeng, Dongguan (CN)

(73) Assignee: DONGGUAN LUXSHARE TECHNOLOGIES CO., LTD, Dongguan City (CN)

(*) Notice: Subject to any disclaimer, the term of this patent is extended or adjusted under 35 U.S.C. 154(b) by 414 days.

(21) Appl. No.: 18/232,527

(22) Filed: Aug. 10, 2023

(65) Prior Publication Data

US 2025/0030198 A1 Jan. 23, 2025

(30) Foreign Application Priority Data

Jul. 21, 2023 (CN) ........................ 202310905466.5

(51) Int. Cl.
*H01R 13/6471* (2011.01)
*H01R 13/24* (2006.01)
(Continued)

(52) U.S. Cl.
CPC ..... *H01R 13/6471* (2013.01); *H01R 13/2407* (2013.01); *H01R 13/516* (2013.01); *H01R 13/629* (2013.01)

(58) Field of Classification Search
CPC ........... H01R 13/6471; H01R 13/2407; H01R 13/516; H01R 13/629; H01R 13/6585; H01R 13/40; H01R 13/02; H01R 13/502
See application file for complete search history.

(56) References Cited

U.S. PATENT DOCUMENTS 10,050,365 B1 * 8/2018 Ju ...................... H01R 13/6583
2019/0372274 A1 * 12/2019 Feng ...................... H01R 13/46
(Continued)

FOREIGN PATENT DOCUMENTS

CN 213484116 U 6/2021
CN 111490380 B * 10/2021 ......... H01R 13/6588

*Primary Examiner* — Abdullah A Riyami
*Assistant Examiner* — Nader J Alhawamdeh
(74) *Attorney, Agent, or Firm* — Birch, Stewart, Kolasch & Birch, LLP

(57) ABSTRACT

An electrical connector includes an insulating body and a first terminal module. The first terminal module includes a first insulating block, a number of first conductive terminals and a first ground sheet. Each first conductive terminal includes a first elastic contact arm having a first contact portion. The first conductive terminals include a first differential signal terminal, a first ground terminal and a second ground terminal. The first elastic contact arm of the first ground terminal defines a first through hole. The first ground sheet includes a first grounding elastic arm inserted into the first through hole. The first grounding elastic arm includes a first abutting portion. The first contact portion of the first ground terminal and the first abutting portion of the first grounding elastic arm are configured to be in contact with a first ground conductive pad of a first mating module.

20 Claims, 19 Drawing Sheets

(51) Int. Cl.
*H01R 13/516* (2006.01)
*H01R 13/629* (2006.01)

(56) References Cited

U.S. PATENT DOCUMENTS

| | | | | |
|---|---|---|---|---|
| 2021/0075159 | A1* | 3/2021 | Wang | H01R 13/6582 |
| 2021/0159642 | A1* | 5/2021 | Yang | H01R 13/6471 |
| 2022/0029359 | A1* | 1/2022 | Lin | H01R 13/6474 |
| 2024/0347955 | A1* | 10/2024 | Huang | H01R 13/424 |
| 2024/0347978 | A1* | 10/2024 | Huang | H01R 13/6471 |
| 2025/0030198 | A1* | 1/2025 | Huang | H01R 13/6585 |

* cited by examiner

ELECTRICAL CONNECTOR WITH IMPROVED SHIELDING FEATURES

CROSS-REFERENCE TO RELATED APPLICATION

This patent application claims priority of a Chinese Patent Application No. 202310905466.5, filed on Jul. 21, 2023 and titled "ELECTRICAL CONNECTOR", the entire content of which is incorporated herein by reference.

TECHNICAL FIELD

The present disclosure relates to an electrical connector, which belongs to a technical field of connectors.

BACKGROUND

An electrical connector in the related art generally includes an insulating body and a terminal module fixed to the insulating body. The terminal module generally includes a pair of differential signal terminals, a first ground terminal located on one side of the pair of differential signal terminals, and a second ground terminal located on the other side of the pair of differential signal terminals. In order to improve the ground shielding effect, the terminal module in the related art may further include a ground sheet which connects all the first ground terminals and all the second ground terminals in series.

When a mating module (such as a mating connector) is inserted into the electrical connector, the first ground terminal and the second ground terminal are in contact with a first ground pad and a second ground pad on the mating module, respectively.

However, the existing design still has room for improvement to meet the requirements for better signal integrity.

SUMMARY

An object of the present disclosure is to provide an electrical connector with improved shielding effect.

In order to achieve the above object, the present disclosure adopts the following technical solution: an electrical connector, including: an insulating body including a mating surface and a first mating slot extending through the mating surface; the first mating slot being configured to receive a first mating module along a mating direction; and a first terminal module including a first insulating block, a plurality of first conductive terminals fixed to the first insulating block, and a first ground sheet located on one side of the first insulating block; wherein each first conductive terminal includes a first fixing portion, a first elastic contact arm extending from one end of the first fixing portion, and a first tail portion extending from another end of the first fixing portion; the first fixing portion is fixed to the first insulating block; the first elastic contact arm includes a first contact portion protruding into the first mating slot; the plurality of first conductive terminals include a plurality of pairs of first differential signal terminals, a plurality of first ground terminal and a plurality of second ground terminal; two sides of each pair of first differential signal terminals are associated with one first ground terminal and one second ground terminal, respectively; the first elastic contact arm of the first ground terminal defines a first through hole; the first ground sheet includes a first base portion; the first base portion includes a first engaging portion in contact with the first fixing portion of the first ground terminal, a second engaging portion in contact with the first fixing portion of the second ground terminal, a first raised portion connecting adjacent first engaging portion and second engaging portion, and a first grounding elastic arm extending from the first engaging portion; the first raised portion is configured to avoid a corresponding pair of first differential signal terminals; the first grounding elastic arm is at least partially inserted into the first through hole; the first grounding elastic arm includes a first abutting portion; the first contact portion of the first elastic contact arm of the first ground terminal is spaced apart from the first abutting portion of the first grounding elastic arm along the mating direction; the first contact portion of the first elastic contact arm of the first ground terminal and the first abutting portion of the first grounding elastic arm are configured to be in contact with a first ground conductive pad of the first mating module.

In order to achieve the above object, the present disclosure adopts the following technical solution: an electrical connector, including: an insulating body including a mating surface and a first mating slot extending through the mating surface; the first mating slot being configured to receive a first mating module along a mating direction; and a first terminal module including a first insulating block, a plurality of first conductive terminals and a first ground sheet; wherein each first conductive terminal includes a first fixing portion, a first elastic contact arm and a first tail portion; the first fixing portion is fixed to the first insulating block; the first elastic contact arm includes a first contact portion protruding into the first mating slot; the plurality of first conductive terminals include a plurality of pairs of first differential signal terminals, a plurality of first ground terminal and a plurality of second ground terminal; two sides of each pair of first differential signal terminals are associated with one first ground terminal and one second ground terminal, respectively; the first elastic contact arm of the first ground terminal defines a first through hole; the first ground sheet includes a first base portion; the first base portion includes a first engaging portion in contact with the first fixing portion of the first ground terminal and a second engaging portion in contact with the first fixing portion of the second ground terminal; the first grounding elastic arm is at least partially inserted into the first through hole; the first grounding elastic arm includes a first abutting portion; the first contact portion of the first elastic contact arm of the first ground terminal is spaced apart from the first abutting portion of the first grounding elastic arm along the mating direction; the first contact portion of the first elastic contact arm of the first ground terminal and the first abutting portion of the first grounding elastic arm are flush with each other and configured to be in contact with a single first ground conductive pad of the first mating module.

Compared with the prior art, in the present disclosure, the first contact portion of the first ground terminal and the first engaging portion of the first grounding elastic arm are disposed at intervals along the mating direction; and the first contact portion of the first ground terminal and the first engaging portion of the first grounding elastic arm are configured to be in contact with the first ground conductive pad of the first mating module. As a result, by forming double contacts, the contact reliability between a grounding structure of the first terminal module and the first ground conductive pad of the first mating module is improved, the shielding effect is improved, and the signal integrity is improved as well.

DETAILED DESCRIPTION

Figure 1:
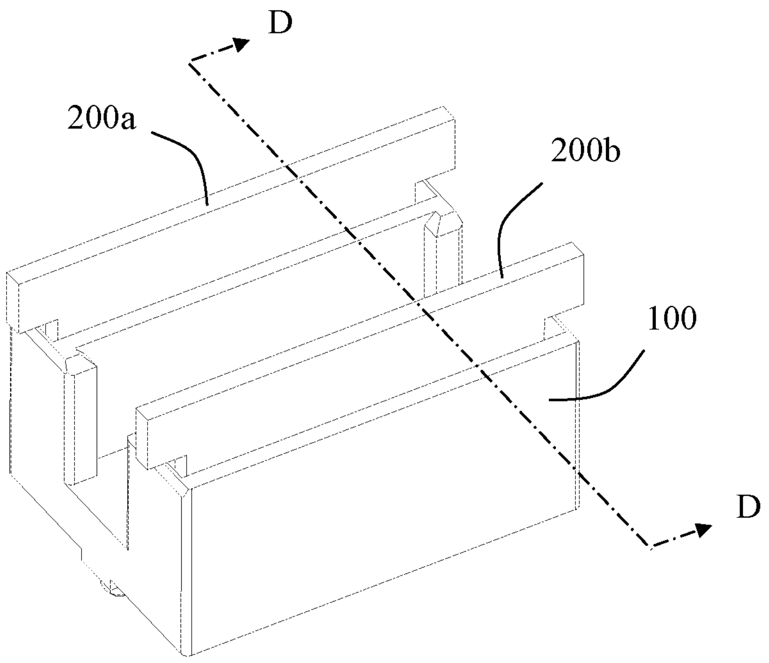
FIG. 1 is a schematic perspective view of a connector assembly in accordance with an illustrated embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 20, the present disclosure discloses a connector assembly, which includes an electrical connector 100 and a mating module 200 for mating with the electrical connector 100. In an embodiment of the present disclosure, the electrical connector 100 is configured to be mounted on a circuit board (not shown). The mating module 200 is configured to be inserted into the electrical connector 100 along a mating direction M. In an illustrated embodiment of the present disclosure, the mating module 200 is an SFP (Small Form Pluggable) plug connector. In the illustrated embodiment of the present disclosure, the mating module 200 includes a first mating module **200*a* and a second mating module 200*b*. The first mating module 200*a* is the same as the second mating module 200*b*, and only the first mating module 200*a*** will be described below as an example.

Figure 2:
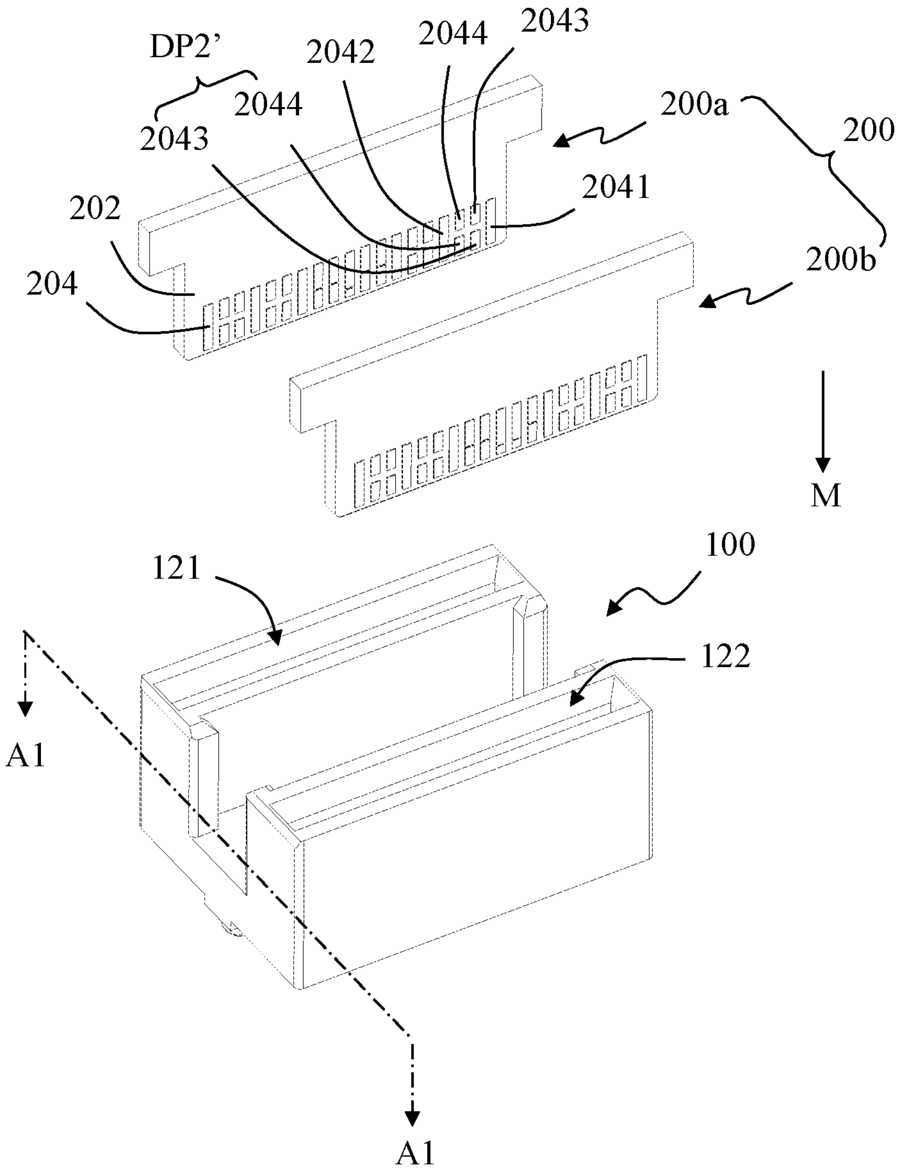
FIG. 2 is a partial perspective exploded view of FIG. 1.
Figure 3:
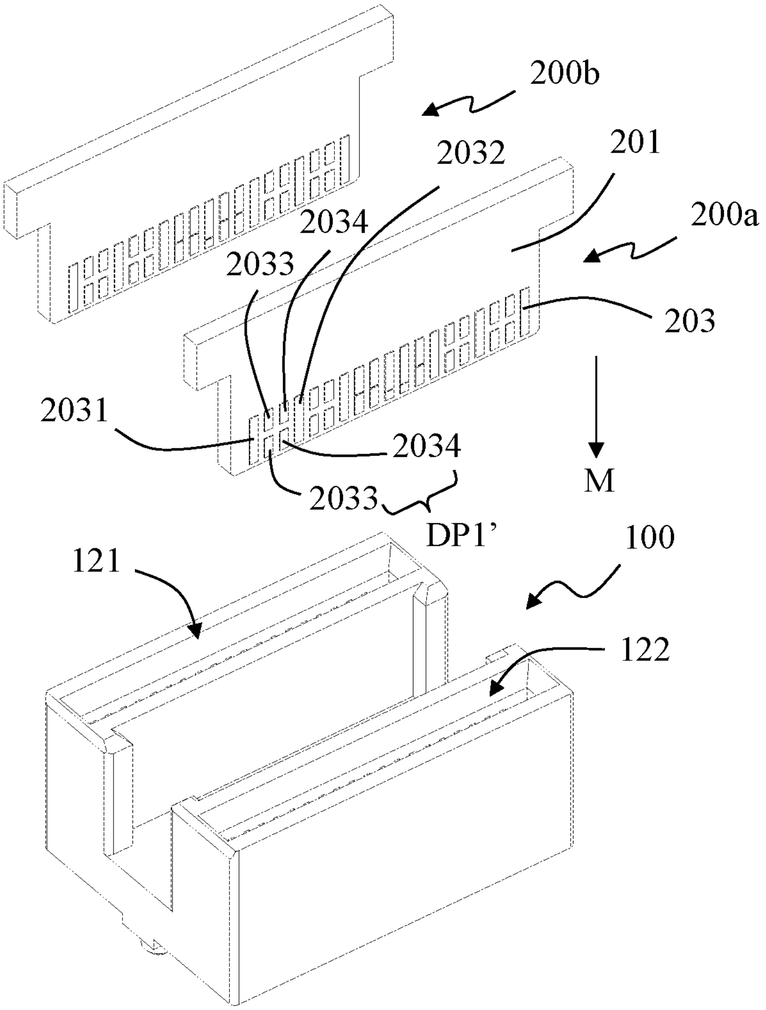
FIG. 3 is a partial perspective exploded view of FIG. 2 from another angle.

Referring to FIG. 2 and FIG. 3, the first mating module **200*a* includes a first surface 201, a second surface 202 opposite to the first surface 201, a plurality of first conductive pads 203 exposed on the first surface 201, and a plurality of second conductive pads 204 exposed on the second surface 202**.

In the illustrated embodiment of the present disclosure, the plurality of first conductive pads 203 include a first ground conductive pad 2031, a second ground conductive pad 2032, a plurality of first signal conductive pads 2033 and a plurality of second signal conductive pads 2034. Wherein, along the mating direction M, two first signal conductive pads 2033 are provided and disposed at intervals, forming a group. Along the mating direction M, two second signal conductive pads 2034 are provided and disposed at intervals, forming a group. The first signal conductive pad 2033 and the second signal conductive pad 2034 form a pair of first differential signal conductive pads DP1'. One side of the pair of first differential signal conductive pads DP1' is associated with one first ground conductive pad 2031, and the other side of the pair of first differential signal conductive pads DP1' is associated with one second ground conductive pad 2032. A length of each of the first ground conductive pads 2031 and each of the second ground conductive pads 2032 is greater than a length of each group of the first signal conductive pads 2033 and a length of each group of the second signal conductive pads 2034.

Similarly, in the illustrated embodiment of the present disclosure, the plurality of second conductive pads 204 include a third ground conductive pad 2041, a fourth ground conductive pad 2042, a plurality of third signal conductive pads 2043 and a plurality of fourth signal conductive pads 2044. Wherein, along the mating direction M, two third signal conductive pads 2043 are provided and arranged at intervals, forming a group. Along the mating direction M, two fourth signal conductive pads 2044 are provided and arranged at intervals, forming a group. The third signal conductive pad 2043 and the fourth signal conductive pad 2044 form a pair of second differential signal conductive pads DP2'. One side of the second differential signal conductive pads DP2' is associated with one third ground conductive pad 2041, and the other side of the pair of second differential signal conductive pads DP2' is associated with one fourth ground conductive pad 2042. A length of each of the third ground conductive pads 2041 and each of the fourth ground conductive pads 2042 is greater than a length of each group of the third signal conductive pads 2043 and a length of each group of the fourth signal conductive pads 2044.

Figure 4:
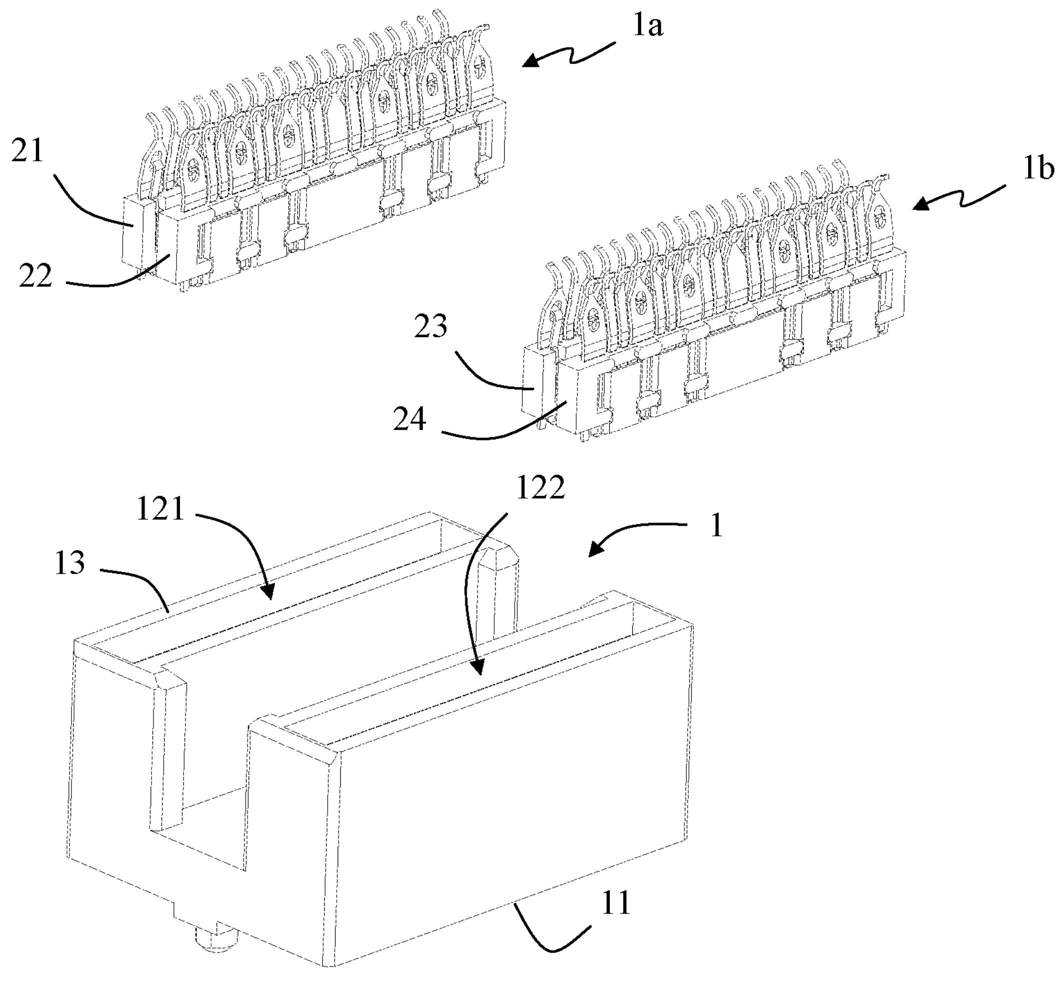
FIG. 4 is a partial perspective view of the electrical connector of the present disclosure, in which a plurality of terminal modules are separated.
Figure 5:
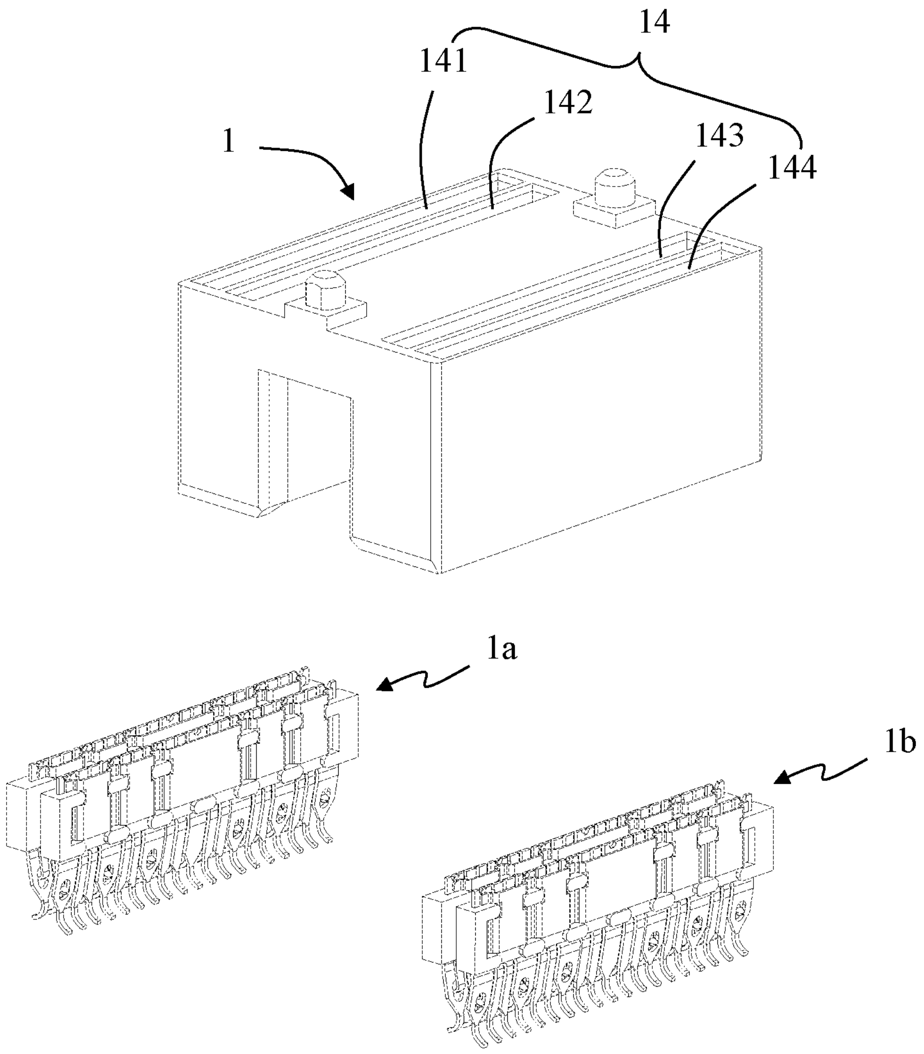
FIG. 5 is a partial perspective exploded view of FIG. 4 from another angle.
Figure 6:
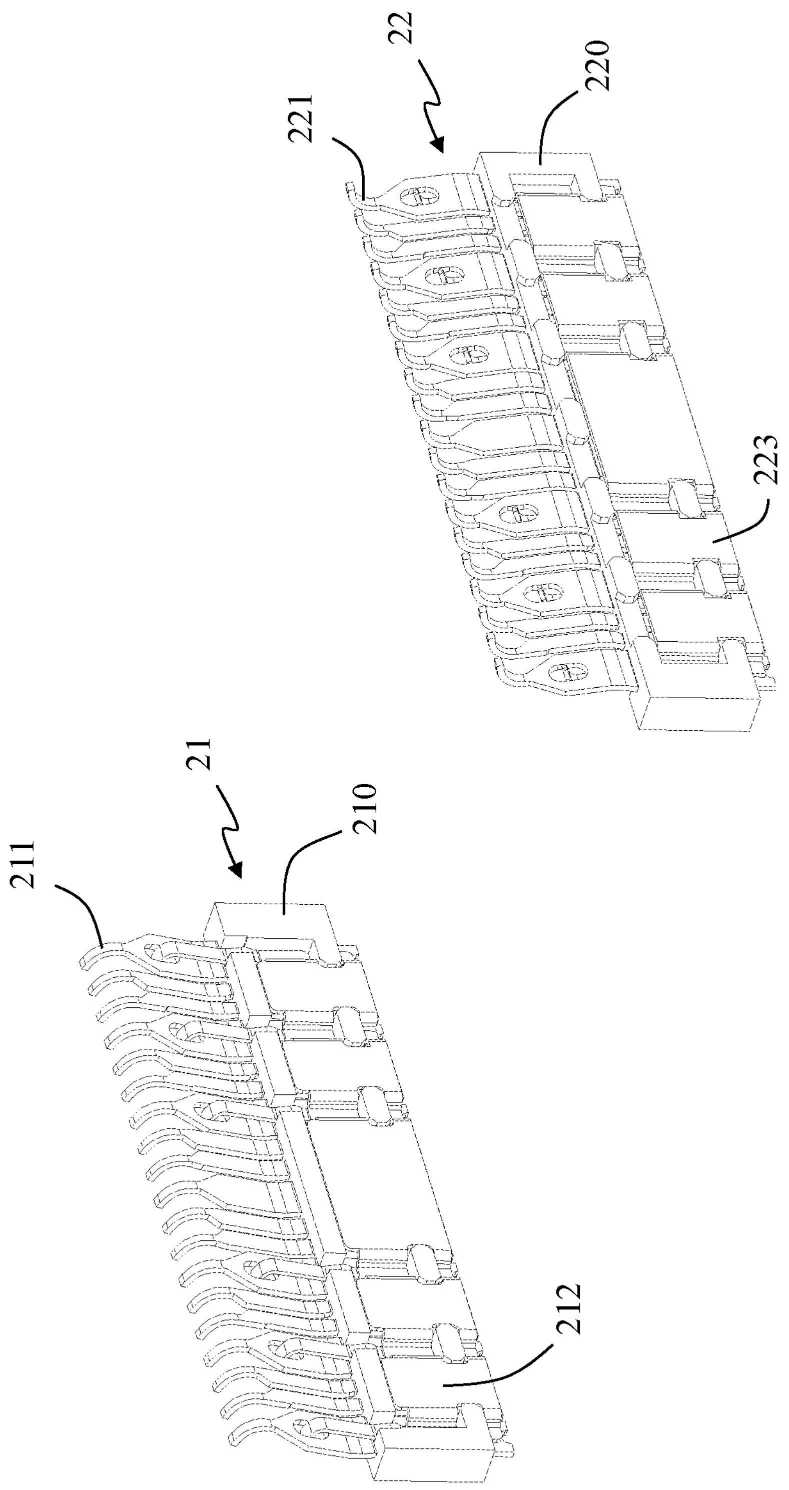
FIG. 6 is a perspective schematic view of a first terminal module and a second terminal module in FIG. 4.
Figure 7:
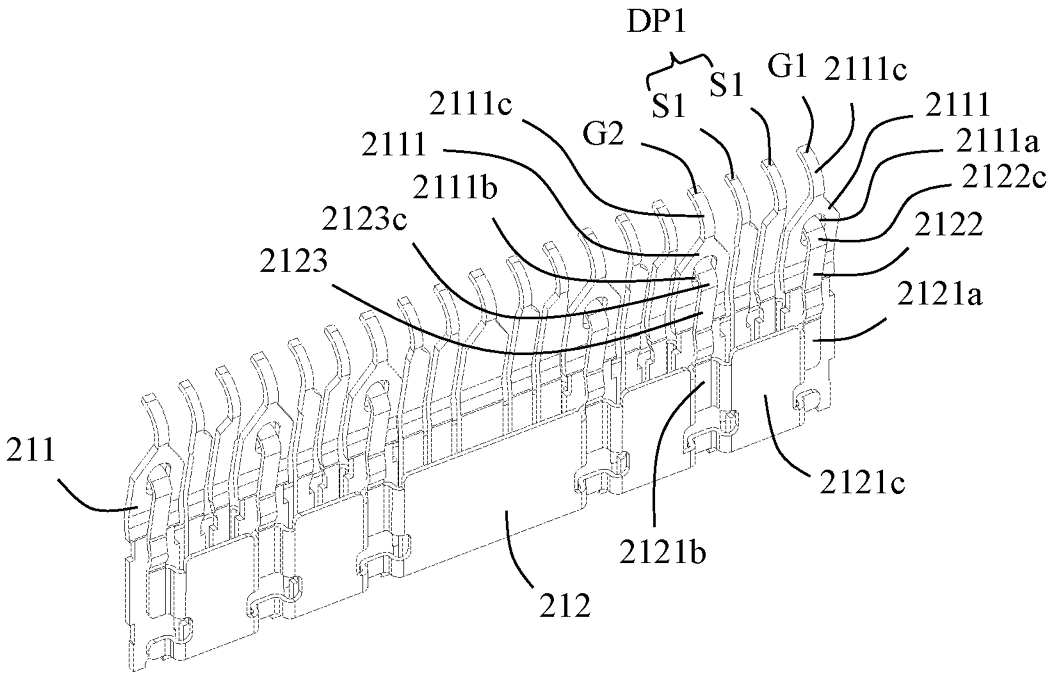
FIG. 7 is a schematic perspective view after removing a first insulating block of the first terminal module in FIG. 6.

Referring to FIG. 4 and FIG. 5, in the illustrated embodiment of the present disclosure, the electrical connector 100 includes an insulating body 1 and a plurality of terminal modules mounted to the insulating body 1.

The insulating body 1 includes a mounting surface 11 (such as a lower surface) configured to be mounted on the circuit board, a mating surface 13 (such as an upper surface) opposite to the mounting surface 11, at least one mating slot 12 extending through the mating surface 13, and at least one mounting slot 14 extending through the mounting surface 11. In the illustrated embodiment of the present disclosure, the at least one mating slot 12 includes a first mating slot 121 and a second mating slot 122 disposed at intervals. The at least one mounting slot 14 includes a first mounting slot 141 communicating with the first mating slot 121, a second mounting slot 142 communicating with the first mating slot 121, a third mounting slot 143 communicating with the second mating slot 122, and a fourth mounting slot 144 communicating with the second mating slot 122.

Referring to FIG. 6 to FIG. 10, in the embodiment shown in the present disclosure, the terminal module includes a first terminal module 21, a second terminal module 22, a third terminal module 23 and a fourth terminal module 24. The first terminal module 21 and the second terminal module 22 form a first group Ta for being assembled and fixed in the first mounting slot 141 and the second mounting slot 142. The third terminal module 23 and the fourth terminal module 24 form a second group 1*b* for being assembled and fixed in the third mounting slot 143 and the fourth mounting slot 144. In the illustrated embodiment of the present disclosure, the first terminal module 21 is the same as the third terminal module 23; and the second terminal module 22 is the same as the fourth terminal module 24. The following only takes the first terminal module 21 and the second terminal module 22 as examples for detailed description.

The first terminal module 21 includes a first insulating block 210, a plurality of first conductive terminals 211 fixed to the first insulating block 210, a first ground sheet 212 located on one side of the first insulating block 210, and a second ground sheet 213 located on the other side of the first insulating block 210. In the illustrated embodiment of the present disclosure, the plurality of first conductive terminals 211 are insert-molded with the first insulating block 210. The first ground sheet 212 and the second ground sheet 213 are assembled and fixed to the first insulating block 210. The first insulating block 210 is mounted and fixed in the first mounting slot 141. Of course, in other embodiments, the first conductive terminals 211, the first ground sheet 212 and the second ground sheet 213 may also be all insert-molded with the first insulating block 210; or the first conductive terminals 211, the first ground sheet 212 and the second ground sheet 213 may also be fixed to the first insulating block 210 by assembling.

Each first conductive terminal 211 includes a first fixing portion 2110, a first elastic contact arm 2111 extending from one end of the first fixing portion 2110, and a first tail portion 2112 extending from the other end of the first fixing portion 2110. The first fixing portion 2110 is partially fixed to the first insulating block 210. The first elastic contact arm 2111 has a first contact portion 2111*c* protruding into the first mating slot 121. The first tail portion 2112 extends out of the first insulating block 210 to be electrically connected to the circuit board. In the illustrated embodiment of the present disclosure, the plurality of first conductive terminals 211 include a plurality of pairs of first differential signal terminals DP1, a plurality of first ground terminals G1 and a plurality of second ground terminals G2. Two sides of each pair of first differential signal terminals DP1 are associated with one first ground terminal G1 and one second ground terminal G2, respectively. Each pair of first differential signal terminals DP1 includes two first signal terminals S1. A width of the first ground terminal G1 is generally larger than a width of each of the first signal terminals S1. A width of the second ground terminal G2 is generally larger than the width of each of the first signal terminals S1. With such configuration, the first terminal module 21 can better transmit high-speed signals, reduce external interference, and improve signal transmission quality. In the illustrated embodiment of the present disclosure, the first elastic contact arm 2111 of the first ground terminal G1 defines a first through hole 2111*a*. The first elastic contact arm 2111 of the second ground terminal G2 defines a second through hole 2111*b*. In the illustrated embodiment of the present disclosure, the first through hole 2111*a* and the second through hole 2111*b* are oval holes.

The first ground sheet 212 includes a first base portion 2121, a plurality of first grounding elastic arms 2122 integrally extending from the first base portion 2121, and a plurality of second grounding elastic arms 2123 integrally extending from the first base portion 2121. The first base portion 2121 includes a first engaging portion 2121*a* in contact with the first fixing portion 2110 of the first ground terminal G1, a second engaging portion 2121*b* in contact with the first fixing portion 2110 of the second ground terminal G2, and a first raised portion 2121*c* connecting the first engaging portion 2121*a* and the second engaging portion 2121*b* which are disposed adjacent to each other. By contacting the first engaging portion 2121*a* and the second engaging portion 2121*b* with a corresponding first ground terminal G1 and a corresponding second ground terminal G2, respectively, all the first ground terminals G1 and all the second ground terminals G2 are connected in series, thereby improving the ground shielding effect. The first raised portion 2121*c* is configured to avoid a corresponding pair of first differential signal terminals DP1, so as to avoid a short circuit due to contact with the pair of first differential signal terminals DP1.

In the illustrated embodiment of the present disclosure, the first grounding elastic arm 2122 is at least partially inserted into the first through hole 2111*a* so as to contact the first elastic contact arm 2111 of the first ground terminal G1. The second grounding elastic arm 2123 is at least partially inserted into the second through hole 2111*b* so as to contact with the first elastic contact arm 2111 of the second ground terminal G2.

Specifically, in the illustrated embodiment of the present disclosure, each first grounding elastic arm 2122 includes a first abutting portion 2122*c* and a first end portion 2122*d* connected to the first abutting portion 2122*c*. The first end portion 2122*d* passes through the first through hole 2111*a*. The second grounding elastic arm 2123 includes a second abutting portion 2123*c* and a second end portion 2123*d* connected to the second abutting portion 2123*c*. The second end portion 2123*d* passes through the second through hole 2111*b*.

Figure 8:
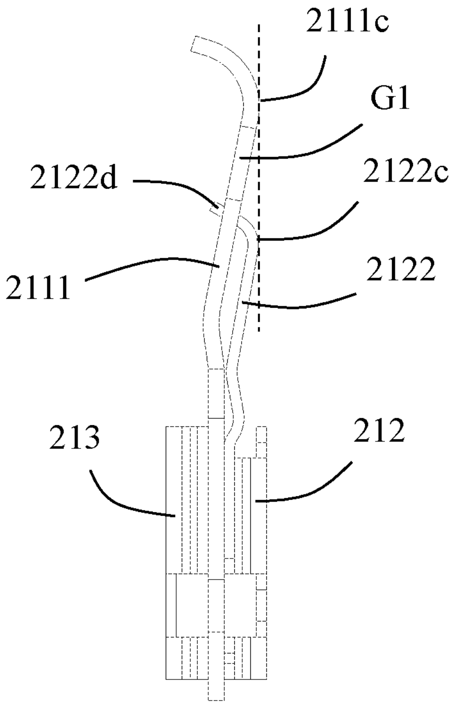
FIG. 8 is a left view of FIG. 7.
Figure 9:
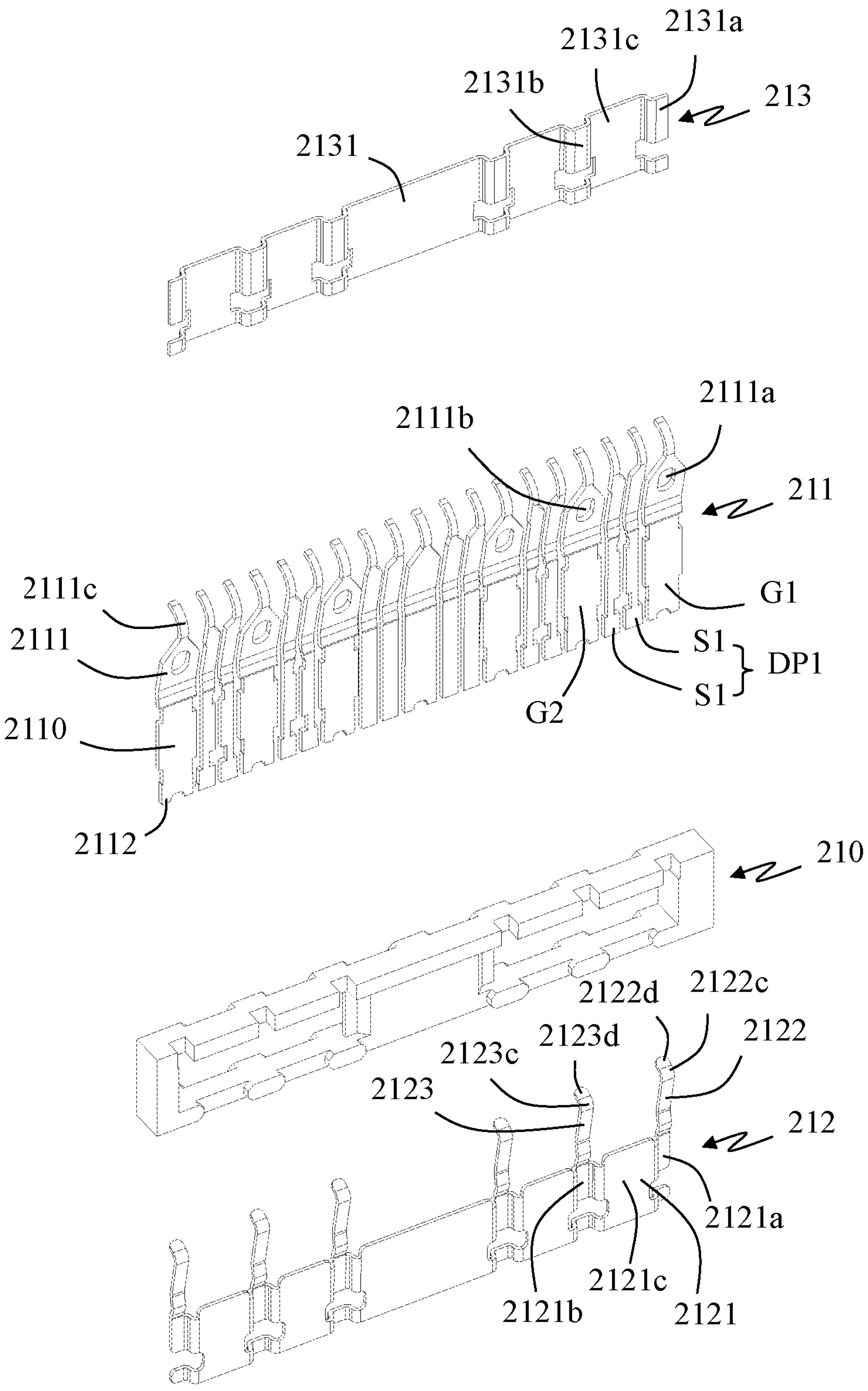
FIG. 9 is a perspective exploded view of the first terminal module in FIG. 6.
Figure 10:
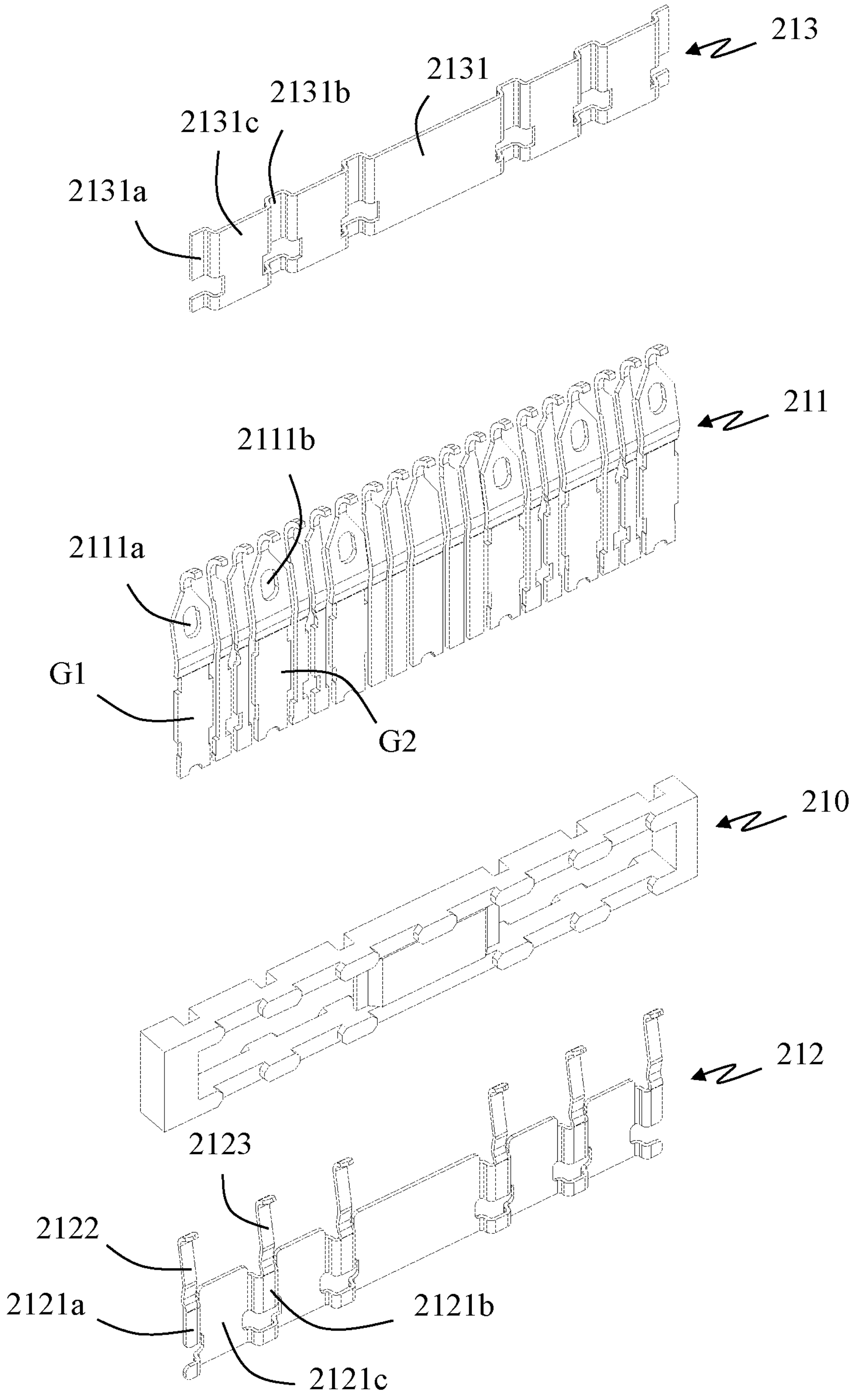
FIG. 10 is a perspective exploded view of FIG. 9 from another angle.
Figure 11:
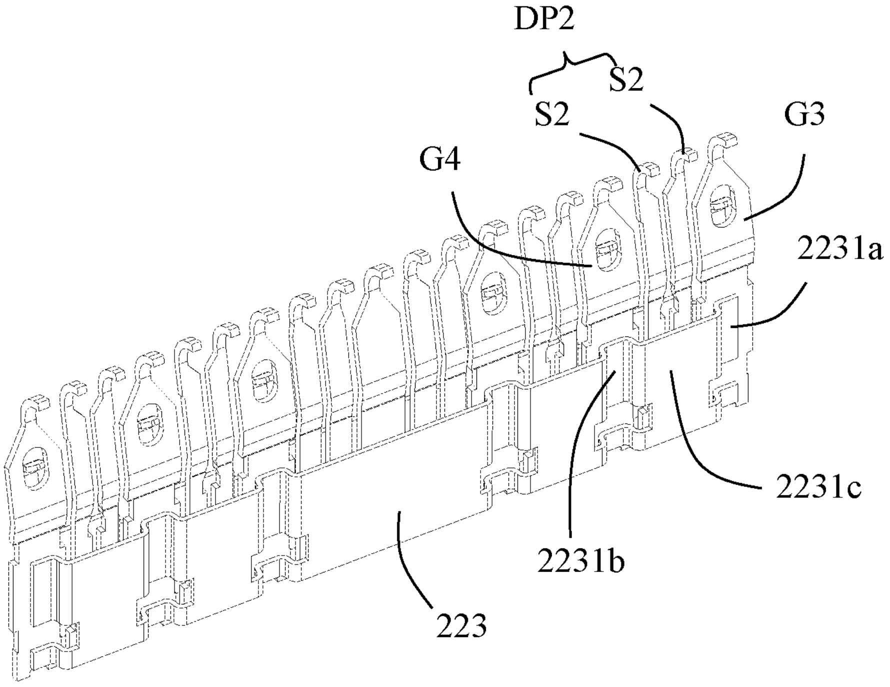
FIG. 11 is a schematic perspective view after removing a second insulating block of the second terminal module in FIG. 6.

Referring to a dotted line in FIG. 8, in the embodiment shown in the present disclosure, the first contact portion 2111*c* of the first elastic contact arm 2111 of the first ground terminal G1 is flush with the first abutting portion 2122*c* of the first grounding elastic arm 2122. The first contact portion 2111*c* of the first elastic contact arm 2111 of the first ground terminal G1 and the first abutting portion 2122*c* of the first grounding elastic arm 2122 are spaced apart along the mating direction M. The first contact portion 2111*c* of the first elastic contact arm 2111 of the first ground terminal G1 and the first abutting portion 2122*c* of the first grounding elastic arm 2122 are configured to be in contact with the first ground conductive pad 2031 of the first mating module 200. With such arrangement, by forming double contacts, the reliability of the first elastic contact arm 2111 of the first ground terminal G1 and the first grounding elastic arm 2122 of the first ground sheet 212 in contact with the first ground conductive pad 2031 of the first mating module 200*a* is improved, the shielding effect is improved, and the signal integrity is improved as well.

Similarly, the first contact portion 2111*c* of the first elastic contact arm 2111 of the second ground terminal G2 and the second abutting portion 2123*c* of the second grounding elastic arm 2123 are spaced apart along the mating direction M. The first contact portion 2111*c* of the first elastic contact arm 2111 of the second ground terminal G2 and the second abutting portion 2123*c* of the second grounding elastic arm 2123 are configured to be in contact with the second ground conductive pad 2032 of the first mating module 200. With such arrangement, by forming double contacts, the reliability of the first elastic contact arm 2111 of the second ground terminal G2 and the second grounding elastic arm 2123 of the first ground sheet 212 in contact with the second ground conductive pad 2032 of the first mating module 200*a* is improved, the shielding effect is improved, and the signal integrity is improved as well.

The second ground sheet 213 includes a second base portion 2131. The second base portion 2131 includes a third engaging portion 2131*a* in contact with the first fixing portion 2110 of the first ground terminal G1, a fourth engaging portion 2131*b* in contact with the first fixing portion 2110 of the second ground terminal G2, and a second raised portion 2131*c* connecting the third engaging portion 2131*a* and the fourth engaging portion 2131*b* which are located adjacent to each other. By contacting the third engaging portion 2131*a* and the fourth engaging portion 2131*b* with the corresponding first ground terminal G1 and the corresponding second ground terminal G2, the grounding area is increased, which is beneficial to further improve the ground shielding effect. The second raised portion 2131*c* is configured to avoid the pair of first differential signal terminals DP1, so as to avoid a short circuit due to contact with the pair of first differential signal terminals DP1.

Figure 15:
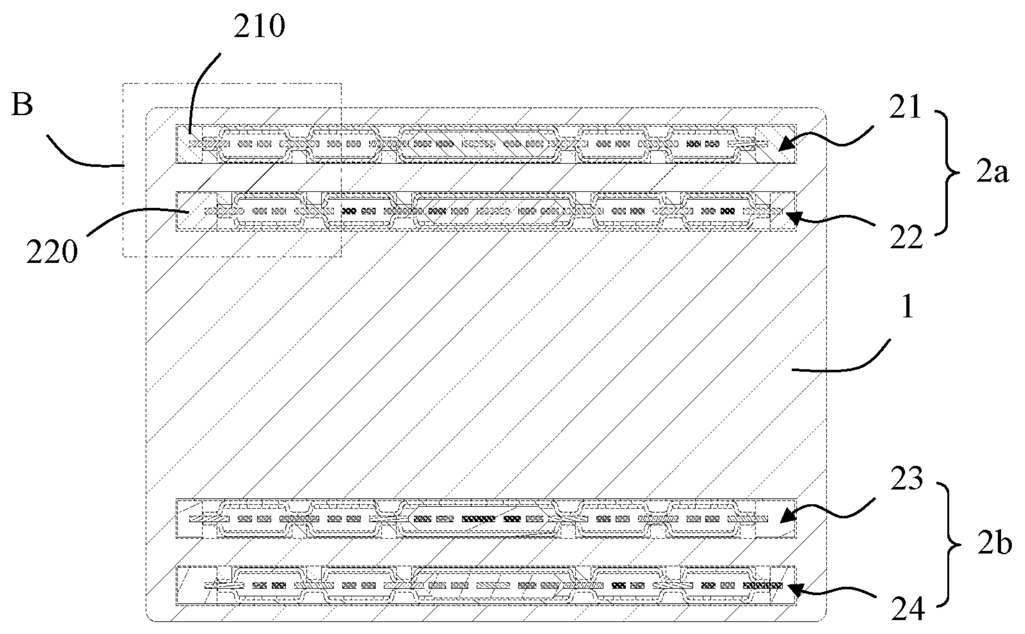
FIG. 15 is a schematic sectional view taken along line A-A in FIG. 2.
Figure 16:
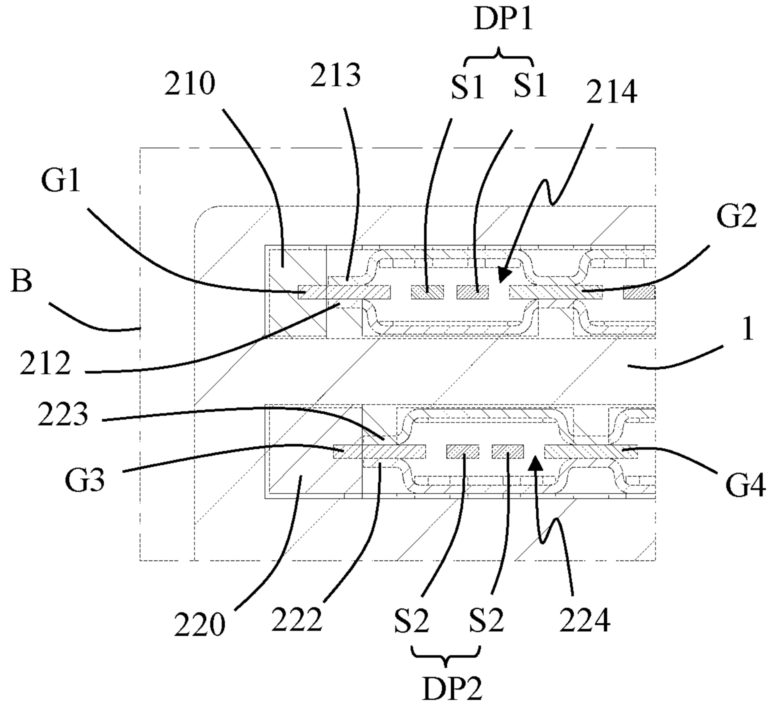
FIG. 16 is a partially enlarged view of a frame part B in FIG. 15.
Figure 17:
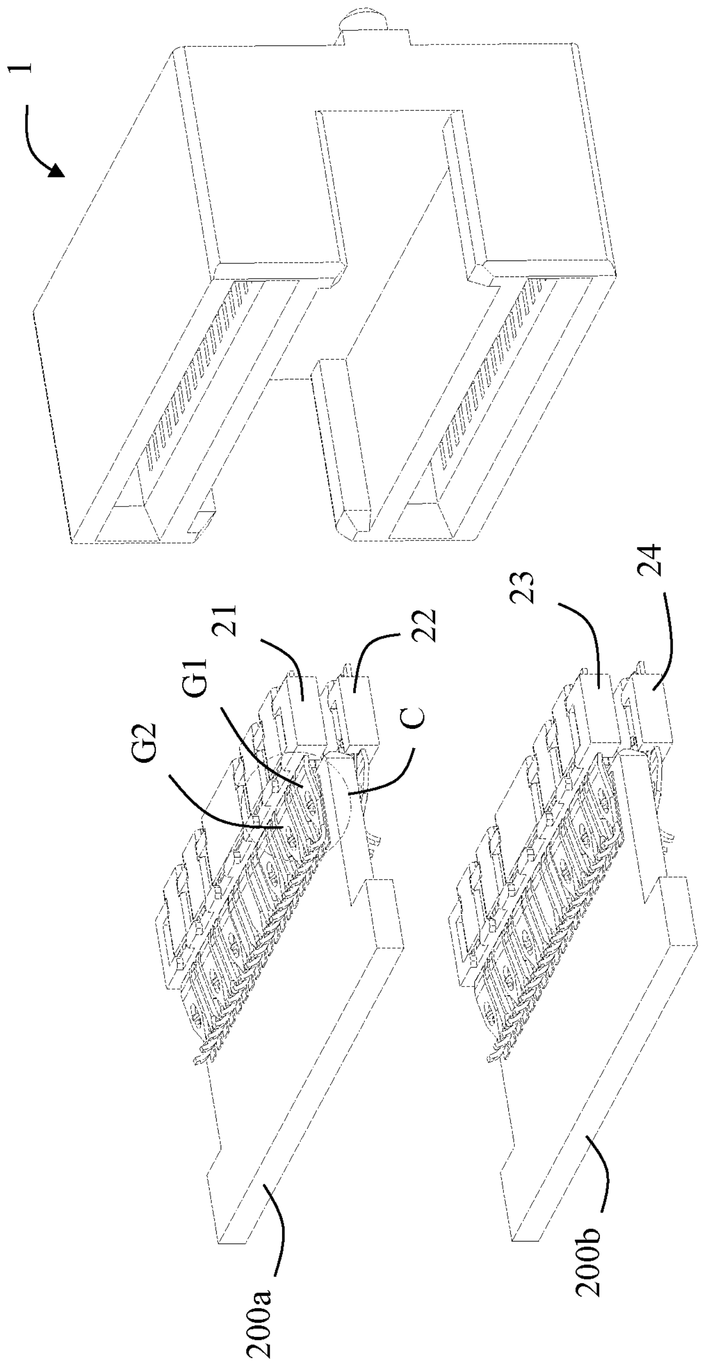
FIG. 17 is a partially exploded perspective view of the connector assembly of the present disclosure from another angle.
Figure 18:
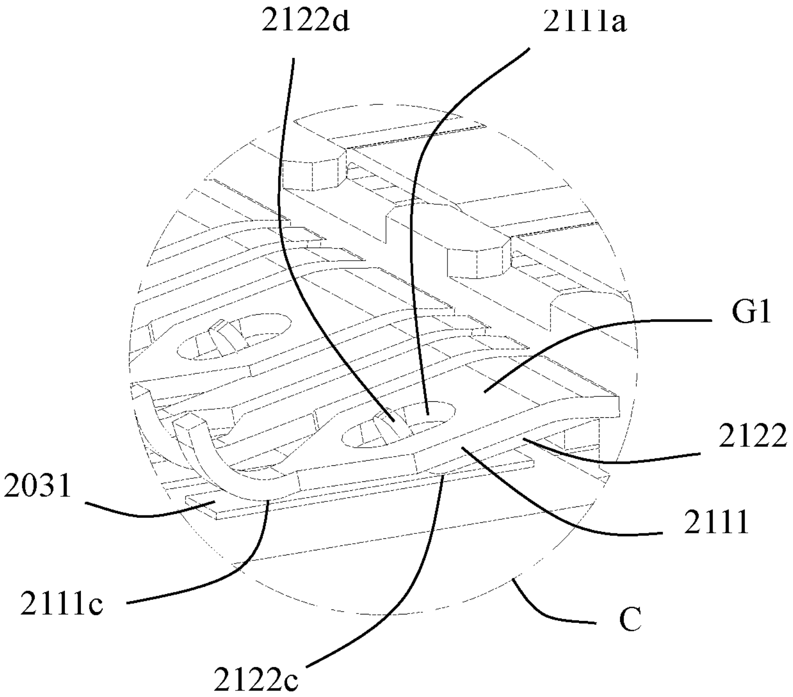
FIG. 18 is a partially enlarged view of a circled part C in FIG. 17.
Figure 19:
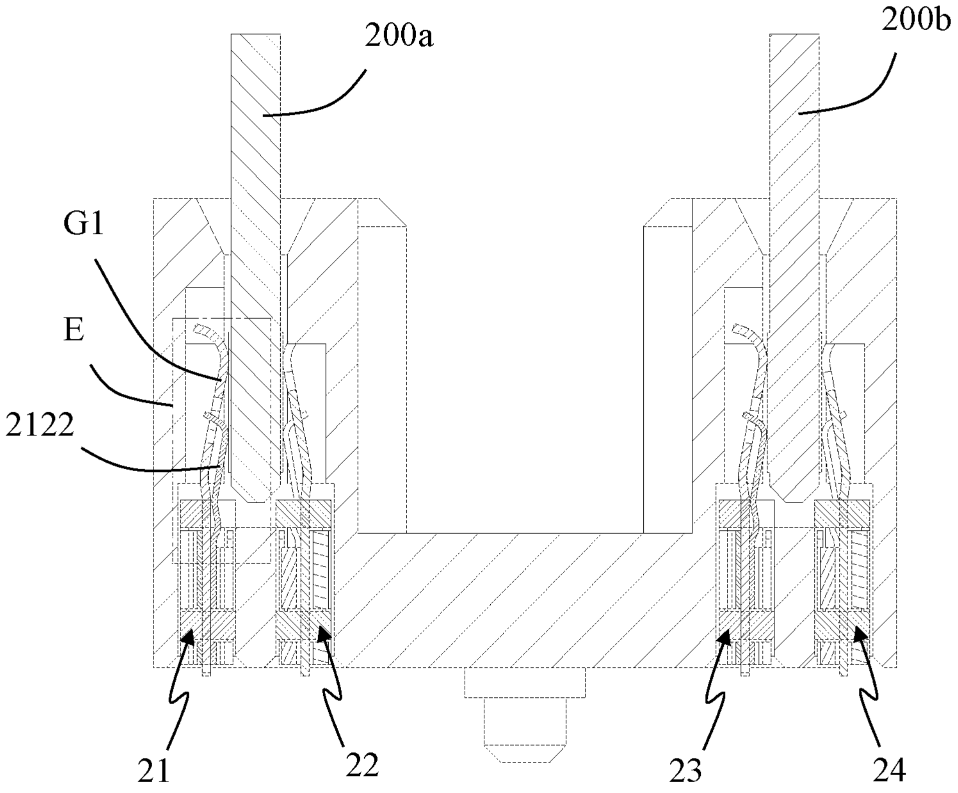
FIG. 19 is a schematic cross-sectional view taken along line D-D in FIG. 1.
Figure 20:
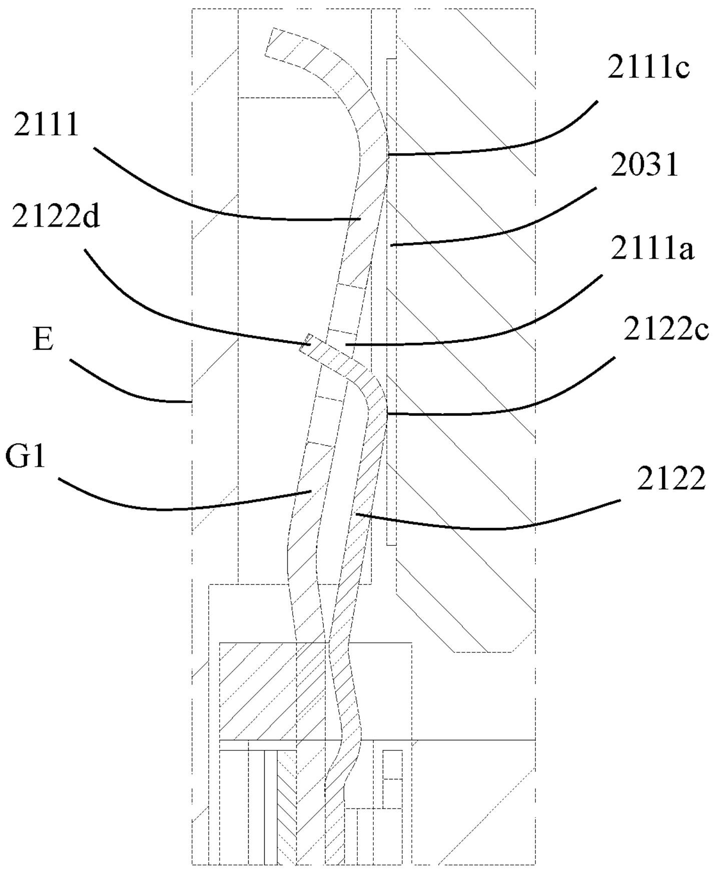
FIG. 20 is a partial enlarged view of a frame part E in FIG. 19.

It is understandable to those skilled in the art that in the illustrated embodiment of the present disclosure, the first base portion 2121 of the first ground sheet 212 and the second base portion 2131 of the second ground sheet 213 are symmetrically disposed on two sides of the first conductive terminals 211. As for the first fixing portion 2110 of the first ground terminal G1, two sides of the first fixing portion 2110 of the first ground terminal G1 are in contact with the first engaging portion 2121*a* of the first ground sheet 212 and the third engaging portion 2131*a* of the second ground sheet 213, respectively. Regarding the first fixing portion 2110 of the second ground terminal G2, two sides of the first fixing portion 2110 of the second ground terminal G2 are in contact with the second engaging portion 2121*b* of the first ground sheet 212 and the fourth engaging portion 2131*b* of the second ground sheet 213, respectively. As shown in FIG. 15 and FIG. 16, each pair of first differential signal terminals DP1 is surrounded by a first annular shielding cavity 214 formed by the first ground terminal G1, the second ground terminal G2, the first ground sheet 212 and the second ground sheet 213 in a circumferential direction, thereby greatly reducing the distortion during signal transmission.

Referring to FIG. 11 to FIG. 14, the second terminal module 22 includes a second insulating block 220, a plurality of second conductive terminals 221 fixed to the second insulating block 220, a third ground sheet 222 located on one side of the second insulating block 220, and a fourth ground sheet 223 located on the other side of the second insulating block 220. In the illustrated embodiment of the present disclosure, the plurality of second conductive terminals 221 are insert-molded with the second insulating block 220. The third ground sheet 222 and the fourth ground sheet 223 are assembled and fixed to the second insulating block 220. The second insulating block 220 is assembled and fixed in the second mounting slot 142. Of course, in other embodiments, the second conductive terminal 221, the third ground sheet 222 and the fourth ground sheet 223 may also be insert-molded with the second insulating block 220; or the second conductive terminal 221, the third ground sheet 222 and the fourth ground sheet 223 may also be fixed to the second insulating block 220 by assembling.

Each second conductive terminal 221 includes a second fixing portion 2210, a second elastic contact arm 2211 extending from one end of the second fixing portion 2210, and a second tail portion 2212 extending from the other end of the second fixing portion 2210. The second fixing portion 2210 is partially fixed to the second insulating block 220. The second elastic contact arm 2211 has a second contact portion 2211*c* protruding into the first mating slot 121. The second tail portion 2212 extends out of the second insulating block 220 to be electrically connected to the circuit board. In the illustrated embodiment of the present disclosure, the plurality of second conductive terminals 221 include a plurality of pairs of second differential signal terminals DP2, a plurality of third ground terminals G3 and a plurality of fourth ground terminals G4. Two sides of each pair of second differential signal terminals DP2 are associated with one third ground terminal G3 and one fourth ground terminal G4, respectively. Each pair of second differential signal terminals DP2 includes two second signal terminals S2. A width of the third ground terminal G3 is generally larger than a width of each of the second signal terminals S2. A width of the fourth ground terminal G4 is generally greater than the width of each of the second signal terminals S2. With such configuration, the second terminal module 22 can better transmit high-speed signals, reduce external interference, and improve signal transmission quality. In the illustrated embodiment of the present disclosure, the second elastic contact arm 2211 of the third ground terminal G3 defines a third through hole 2211*a*. The second elastic contact arm 2211 of the fourth ground terminal G4 defines a fourth through hole 2211*b*. In the illustrated embodiment of the present disclosure, the third through hole 2211*a* and the fourth through hole 2211*b* are oval holes.

The third ground sheet 222 includes a third base portion 2221, a plurality of third grounding elastic arms 2222 extending integrally from the third base portion 2221, and a plurality of fourth grounding elastic arms 2223 integrally extending from the third base portion 2221. The third base portion 2221 includes a fifth engaging portion 2221*a* in contact with the second fixing portion 2210 of the third ground terminal G3, a sixth engaging portion 2221*b* in contact with the second fixing portion 2210 of the fourth ground terminal G4, and a third raised portion 2221*c* connecting the fifth engaging portion 2221*a* and the sixth engaging portion 2221*b* which are located adjacent to each other. By contacting the fifth engaging portion 2221*a* and the sixth engaging portion 2221*b* with a corresponding third ground terminal G3 and a corresponding the fourth ground terminal G4, all the third ground terminals G3 and all the fourth ground terminals G4 are connected in series, thereby improving the ground shielding effect. The third raised portion 2221*c* is configured to avoid the pair of second differential signal terminals DP2, so as to avoid a short circuit due to contact with the pair of second differential signal terminals DP2.

In the illustrated embodiment of the present disclosure, the third grounding elastic arm 2222 is at least partially inserted into the third through hole 2211*a* so as to contact with the second elastic contact arm 2211 of the third ground terminal G3. The fourth grounding elastic arm 2223 is at least partially inserted into the fourth through hole 2211*b* so as to contact with the second elastic contact arm 2211 of the fourth ground terminal G4.

Specifically, in the illustrated embodiment of the present disclosure, the third grounding elastic arm 2222 includes a third abutting portion 2222*c* and a third end portion 2222*d* connected to the third abutting portion 2222*c*. The third end portion 2222*d* passes through the third through hole 2211*a*. The fourth grounding elastic arm 2223 includes a fourth abutting portion 2223*c* and a fourth end portion 2223*d* connected to the fourth abutting portion 2223*c*. The fourth end portion 2223*d* passes through the fourth through hole 2211*b*.

Since the first through hole 2111*a*, the second through hole 2111*b*, the third through hole 2211*a* and the fourth through hole 2211*b* are all oval holes, when the first mating module 200*a* is inserted, the first end portion 2122*d* can move slightly in the first through hole 2111*a*, the second end portion 2123*d* can move slightly in the second through hole 2111*b*, the third end portion 2222*d* can move slightly in the third through hole 2211*a*, and the fourth end portion 2223*d* can move slightly in the fourth through hole 2211*b*.

Figure 12:
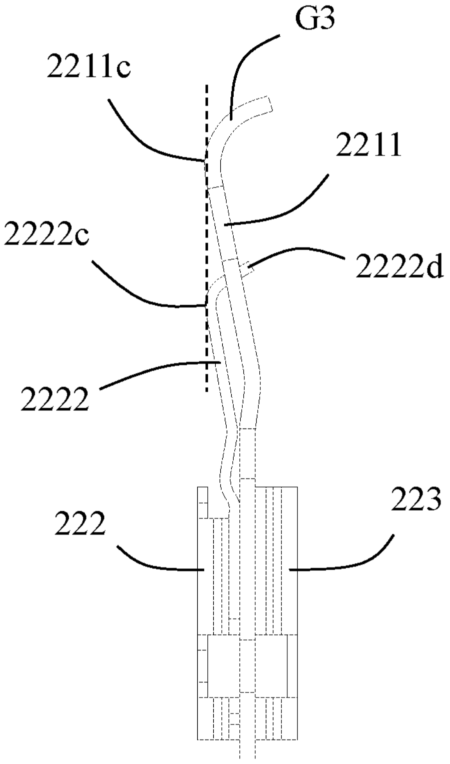
FIG. 12 is a left view of FIG. 11.
Figure 13:
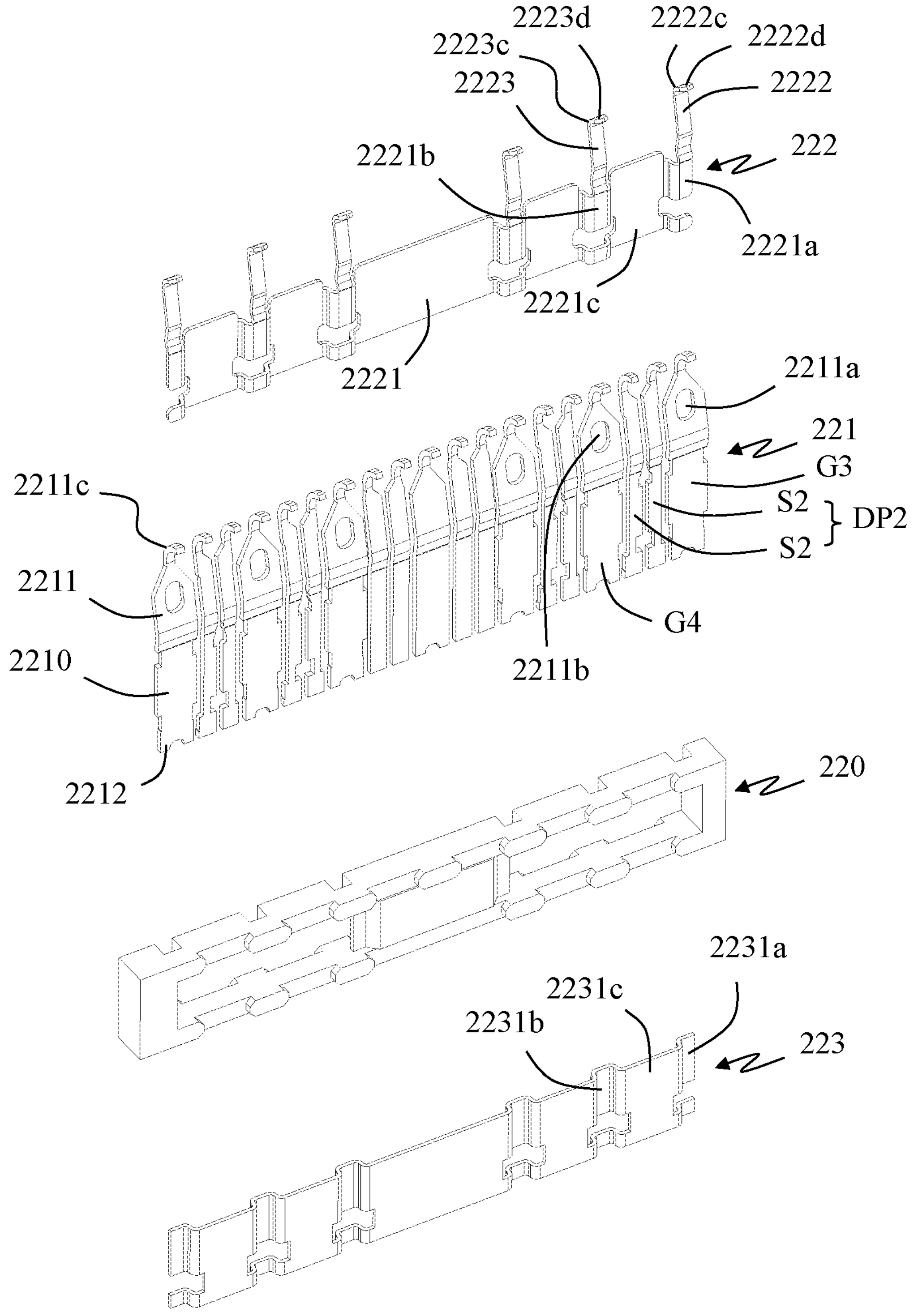
FIG. 13 is a perspective exploded view of the second terminal module in FIG. 6.
Figure 14:
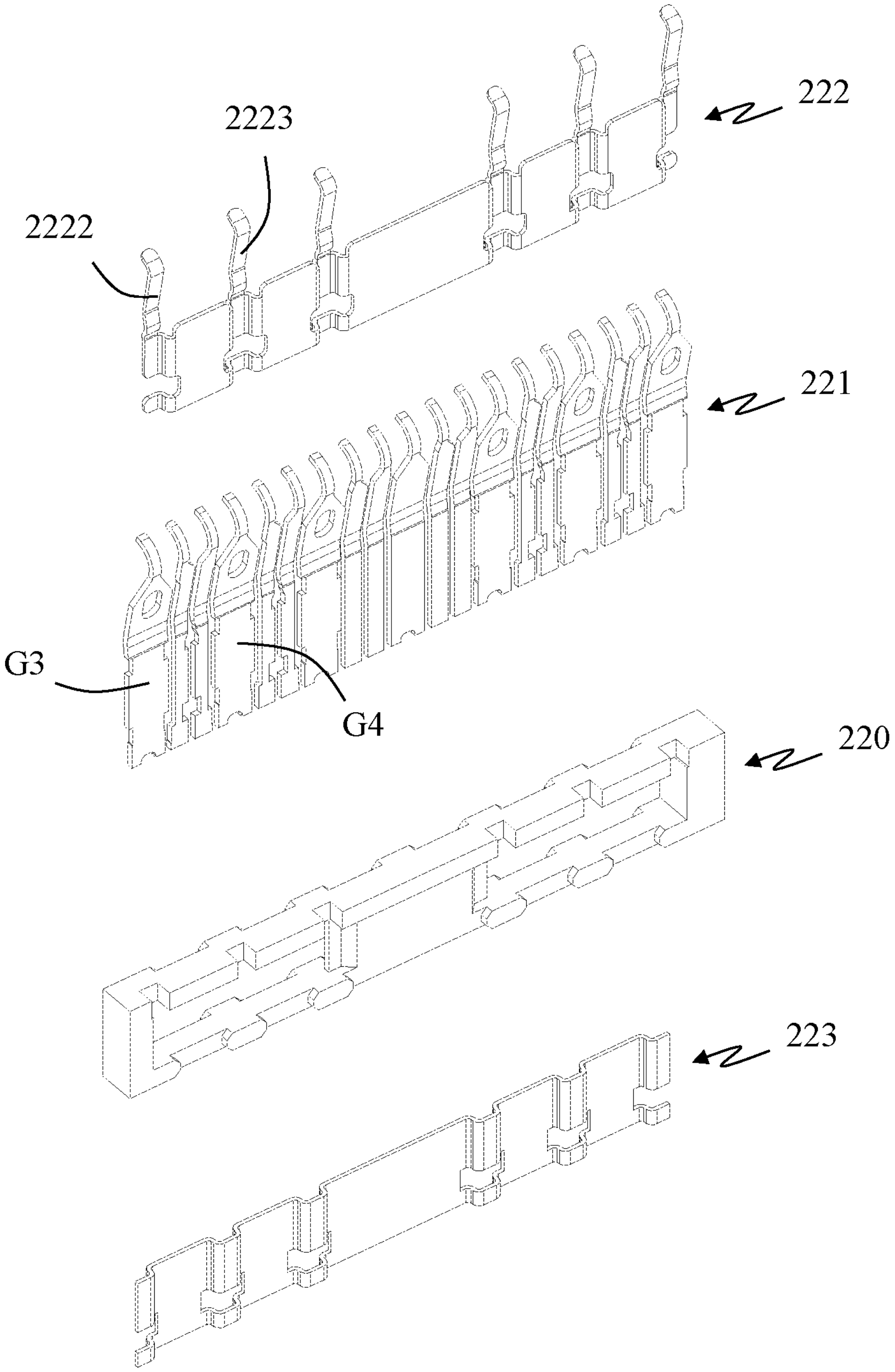
FIG. 14 is a perspective exploded view of FIG. 13 from another angle.

Referring to a dotted line in FIG. 12, in the embodiment shown in the present disclosure, the second contact portion 2211*c* of the second elastic contact arm 2211 of the third ground terminal G3 is flush with the third abutting portion 2222*c* of the third grounding elastic arm 2222. The second contact portion 2211*c* of the second elastic contact arm 2211 of the third ground terminal G3 and the third abutting portion 2222*c* of the third grounding elastic arm 2222 are spaced apart along the mating direction M. The second contact portion 2211*c* of the second elastic contact arm 2211 of the third ground terminal G3 and the third abutting portion 2222*c* of the third grounding elastic arm 2222 are configured to be in contact with a third ground conductive pad 2041 of the first mating module 200. With such arrangement, by forming double contacts, the reliability of the second elastic contact arm 2211 of the third ground terminal G3 and the third grounding elastic arm 2222 of the third ground sheet 222 in contact with the third ground conductive pad 2041 of the first mating module 200*a* is improved, the shielding effect is improved, and the signal integrity is improved as well.

Similarly, the second contact portion 2211*c* of the second elastic contact arm 2211 of the fourth ground terminal G4 and the fourth abutting portion 2223*c* of the fourth grounding elastic arm 2223 are spaced apart along the mating direction M. The second contact portion 2211*c* of the second elastic contact arm 2211 of the fourth ground terminal G4 and the fourth abutting portion 2223*c* of the fourth grounding elastic arm 2223 are configured to be in contact with a fourth ground conductive pad 2042 of the first mating module 200. With such arrangement, by forming double contacts, the reliability of the second elastic contact arm 2211 of the fourth ground terminal G4 and the fourth grounding elastic arm 2223 of the third ground sheet 222 in contact with the fourth ground conductive piece 2042 of the first mating module 200*a* is improved, the shielding effect is improved, and the signal integrity is improved as well.

The fourth ground sheet 223 includes a fourth base portion 2231. The fourth base portion 2231 includes a seventh engaging portion 2231*a* in contact with the second fixing portion 2210 of the third ground terminal G3, an eighth engaging portion 2231*b* in contact with the second fixing portion 2210 of the fourth ground terminal G4, and a fourth raised portion 2231*c* connecting the seventh engaging portion 2231*a* and the eighth engaging portion 2231*b* which are located adjacent to each other. By contacting the seventh engaging portion 2231*a* and the eighth engaging portion 2231*b* with the corresponding third ground terminal G3 and the corresponding fourth ground terminal G4, the grounding area is increased, which is beneficial to further improve the ground shielding effect. The fourth raised portion 2231*c* is configured to avoid the pair of second differential signal terminals DP2, so as to avoid a short circuit due to contact with the pair of second differential signal terminals DP2.

It is understandable to those skilled in the art that, in the illustrated embodiment of the present disclosure, the third base portion 2221 of the third ground sheet 222 and the fourth base portion 2231 of the fourth ground sheet 223 are symmetrically disposed on two sides of the second conductive terminals 221. As for the second fixing portion 2210 of the third ground terminal G3, two sides of the second fixing portion 2210 of the third ground terminal G3 are in contact with the fifth engaging portion 2221*a* of the third ground sheet 222 and the seventh engaging portion 2231*a* of the fourth ground sheet 223, respectively. As for the second fixing portion 2210 of the fourth ground terminal G4, two sides of the second fixing portion 2210 of the fourth ground terminal G4 are in contact with the sixth engaging portion 2221*b* of the third ground sheet 222 and the eighth engaging portion 2231*b* of the fourth ground sheet 223, respectively. As shown in FIG. 15 and FIG. 16, each pair of second differential signal terminals DP2 is surrounded by a second annular shielding cavity 224 formed by the third ground terminal G3, the fourth ground terminal G4, the third ground sheet 222 and the fourth ground sheet 223 in a circumferential direction, thereby greatly reducing the distortion during signal transmission.

In the illustrated embodiment of the present disclosure, the first elastic contact arm 2111 and the second elastic contact arm 2211 extend into the first mating slot 121. The first elastic contact arm 2111 and the second elastic contact arm 2211 are located on two sides of the first mating slot 121, respectively. The first elastic contact arm 2111 protrudes toward the second elastic contact arm 2211. The second elastic contact arm 2211 protrudes toward the first elastic contact arm 2111. In this way, the first elastic contact arm 2111 and the second elastic contact arm 2211 can jointly clamp the first mating module 200*a*, so as to improve mating reliability.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body comprising a mating surface and a first mating slot extending through the mating surface; the first mating slot being configured to receive a first mating module along a mating direction; and a first terminal module comprising a first insulating block, a plurality of first conductive terminals fixed to the first insulating block, and a first ground sheet located on one side of the first insulating block;

wherein each first conductive terminal comprises a first fixing portion, a first elastic contact arm extending from one end of the first fixing portion, and a first tail portion extending from another end of the first fixing portion; the first fixing portion is fixed to the first insulating block; the first elastic contact arm comprises a first contact portion protruding into the first mating slot;

the plurality of first conductive terminals comprise a plurality of pairs of first differential signal terminals, a plurality of first ground terminal and a plurality of second ground terminal; two sides of each pair of first differential signal terminals are associated with one first ground terminal and one second ground terminal, respectively; the first elastic contact arm of the first ground terminal defines a first through hole;

the first ground sheet comprises a first base portion; the first base portion comprises a first engaging portion in contact with the first fixing portion of the first ground terminal, a second engaging portion in contact with the first fixing portion of the second ground terminal, a first raised portion connecting adjacent first engaging portion and second engaging portion, and a first grounding elastic arm extending from the first engaging portion; the first raised portion is configured to avoid a corresponding pair of first differential signal terminals; the first grounding elastic arm is at least partially inserted into the first through hole; the first grounding elastic arm comprises a first abutting portion;

the first contact portion of the first elastic contact arm of the first ground terminal is spaced apart from the first abutting portion of the first grounding elastic arm along the mating direction; the first contact portion of the first elastic contact arm of the first ground terminal and the first abutting portion of the first grounding elastic arm are configured to be in contact with a first ground conductive pad of the first mating module.

2. The electrical connector according to claim 1, wherein the first grounding elastic arm comprises a first end portion connected to the first abutting portion, and the first end portion passes through the first through hole.

3. The electrical connector according to claim 1, wherein the first elastic contact arm of the second ground terminal defines a second through hole;

the first ground sheet comprises a second grounding elastic arm extending from the second engaging portion; the second grounding elastic arm is at least partially inserted into the second through hole; the second grounding elastic arm comprises a second abutting portion;

the first contact portion of the first elastic contact arm of the second ground terminal and the second abutting portion of the second grounding elastic arm are disposed at intervals along the mating direction; the first contact portion of the first elastic contact arm of the second ground terminal and the second abutting portion of the second grounding elastic arm are configured to be in contact with a second ground conductive pad of the first mating module.

4. The electrical connector according to claim 3, wherein the second grounding elastic arm comprises a second end portion connected to the second abutting portion, and the second end portion passes through the second through hole.

5. The electrical connector according to claim 1, wherein the first terminal module comprises a second ground sheet located on another side of the first insulating block; the second ground sheet comprises a second base portion; the second base portion comprises a third engaging portion in contact with the first fixing portion of the first ground terminal, a fourth engaging portion in contact with the first fixing portion of the second ground terminal, and a second raised portion connecting adjacent third engaging portion and fourth engaging portion; the second raised portion is configured to avoid the corresponding pair of first differential signal terminals.

6. The electrical connector according to claim 5, wherein each pair of first differential signal terminals is surrounded by a first annular shielding cavity formed by the first ground terminal, the second ground terminal, the first ground sheet and the second ground sheet in a circumferential direction.

7. The electrical connector according to claim 1, further comprising a second terminal module; wherein the second terminal module comprises a second insulating block, a plurality of second conductive terminals fixed to the second insulating block, and a third ground sheet located on one side of the second insulating block;

each second conductive terminal comprises a second fixing portion, a second elastic contact arm extending from one end of the second fixing portion, and a second tail portion extending from another end of the second fixing portion; the second fixing portion is fixed to the second insulating block; the second elastic contact arm comprises a second contact portion protruding into the first mating slot;

the plurality of second conductive terminals comprise a plurality of pairs of second differential signal terminals, a plurality of third ground terminals and a plurality of fourth ground terminals; two sides of each pair of second differential signal terminals are associated with one third ground terminal and one fourth ground terminal, respectively; the second elastic contact arm of the third ground terminal defines a third through hole;

the third ground sheet comprises a third base portion; the third base portion comprises a fifth engaging portion in contact with the second fixing portion of the third ground terminal, a sixth engaging portion in contact with the second fixing portion of the fourth ground terminal, a third raised portion connecting adjacent fifth engaging portion and sixth engaging portion, and a third grounding elastic arm extending from the fifth engaging portion; the third raised portion is configured to avoid a corresponding pair of second differential signal terminals; the third grounding elastic arm is at least partially inserted into the third through hole; the third grounding elastic arm comprises a third abutting portion;

the second contact portion of the second elastic contact arm of the third ground terminal and the third abutting portion of the third grounding elastic arm are disposed at intervals along the mating direction; the second contact portion of the second elastic contact arm of the third ground terminal and the third abutting portion of the third grounding elastic arm are configured to be in contact with a third ground conductive pad of the first mating module.

8. The electrical connector according to claim 7, wherein the third grounding elastic arm comprises a third end portion connected to the third abutting portion, and the third end portion passes through the third through hole.

9. The electrical connector according to claim 7, wherein the second elastic contact arm of the fourth ground terminal defines a fourth through hole;

the third ground sheet comprises a fourth grounding elastic arm extending from the sixth engaging portion; the fourth grounding elastic arm is at least partially inserted into the fourth through hole; the fourth grounding elastic arm comprises a fourth abutting portion;

the second contact portion of the second elastic contact arm of the fourth ground terminal is spaced apart from the fourth abutting portion of the fourth grounding elastic arm along the mating direction; the second contact portion of the second elastic contact arm of the fourth ground terminal and the fourth abutting portion of the fourth grounding elastic arm are configured to be in contact with the fourth ground conductive pad of the first mating module.

10. The electrical connector according to claim 9, wherein the fourth grounding elastic arm comprises a fourth end portion connected to the fourth abutting portion, and the fourth end portion passes through the fourth through hole.

11. The electrical connector according to claim 7, wherein the second terminal module comprises a fourth ground sheet located on another side of the second insulating block; the fourth ground sheet comprises a fourth base portion; the fourth base portion comprises a seventh engaging portion in contact with the second fixing portion of the third ground terminal, an eighth engaging portion in contact with the second fixing portion of the fourth ground terminal, and a fourth raised portion connecting adjacent seventh engaging portion and eighth engaging portion; the fourth raised portion is configured to avoid the corresponding pair of second differential signal terminals.

12. The electrical connector according to claim 11, wherein each pair of second differential signal terminals is surrounded by a second annular shielding cavity formed by the third ground terminal, the fourth ground terminal, the third ground sheet and the fourth ground sheet in a circumferential direction.

13. An electrical connector, comprising:

an insulating body comprising a mating surface and a first mating slot extending through the mating surface; the first mating slot being configured to receive a first mating module along a mating direction; and a first terminal module comprising a first insulating block, a plurality of first conductive terminals and a first ground sheet;

wherein each first conductive terminal comprises a first fixing portion, a first elastic contact arm and a first tail portion; the first fixing portion is fixed to the first insulating block; the first elastic contact arm comprises a first contact portion protruding into the first mating slot;

the plurality of first conductive terminals comprise a plurality of pairs of first differential signal terminals, a plurality of first ground terminal and a plurality of second ground terminal; two sides of each pair of first differential signal terminals are associated with one first ground terminal and one second ground terminal, respectively; the first elastic contact arm of the first ground terminal defines a first through hole;

the first ground sheet comprises a first base portion; the first base portion comprises a first engaging portion in contact with the first fixing portion of the first ground terminal and a second engaging portion in contact with the first fixing portion of the second ground terminal; the first grounding elastic arm is at least partially inserted into the first through hole; the first grounding elastic arm comprises a first abutting portion;

the first contact portion of the first elastic contact arm of the first ground terminal is spaced apart from the first abutting portion of the first grounding elastic arm along the mating direction; the first contact portion of the first elastic contact arm of the first ground terminal and the first abutting portion of the first grounding elastic arm are flush with each other and configured to be in contact with a single first ground conductive pad of the first mating module.

14. The electrical connector according to claim 13, wherein the first grounding elastic arm comprises a first end portion connected to the first abutting portion, and the first end portion passes through the first through hole.

15. The electrical connector according to claim 13, wherein the first elastic contact arm of the second ground terminal defines a second through hole;

the first ground sheet comprises a second grounding elastic arm extending from the second engaging portion; the second grounding elastic arm is at least partially inserted into the second through hole; the second grounding elastic arm comprises a second abutting portion;

the first contact portion of the first elastic contact arm of the second ground terminal and the second abutting portion of the second grounding elastic arm are disposed at intervals along the mating direction; the first contact portion of the first elastic contact arm of the second ground terminal and the second abutting portion of the second grounding elastic arm are flush with each other and configured to be in contact with a second ground conductive pad of the first mating module.

16. The electrical connector according to claim 15, wherein the second grounding elastic arm comprises a second end portion connected to the second abutting portion, and the second end portion passes through the second through hole.

17. The electrical connector according to claim 13, wherein the first terminal module comprises a second ground sheet; the first ground sheet and the second ground sheet are disposed on opposite sides of the first insulating block, respectively; the second ground sheet comprises a second base portion; the second base portion comprises a third engaging portion in contact with the first fixing portion of the first ground terminal and a fourth engaging portion in contact with the first fixing portion of the second ground terminal.

18. The electrical connector according to claim 17, wherein each pair of first differential signal terminals is surrounded by a first annular shielding cavity formed by the first ground terminal, the second ground terminal, the first ground sheet and the second ground sheet in a circumferential direction.

19. The electrical connector according to claim 13, further comprising a second terminal module; wherein the second terminal module comprises a second insulating block, a plurality of second conductive terminals fixed to the second insulating block, and a third ground sheet located on one side of the second insulating block;

each second conductive terminal comprises a second fixing portion, a second elastic contact arm extending from one end of the second fixing portion, and a second tail portion extending from another end of the second fixing portion; the second fixing portion is fixed to the second insulating block; the second elastic contact arm comprises a second contact portion protruding into the first mating slot;

the plurality of second conductive terminals comprise a plurality of pairs of second differential signal terminals, a plurality of third ground terminals and a plurality of fourth ground terminals; two sides of each pair of second differential signal terminals are associated with one third ground terminal and one fourth ground terminal, respectively; the second elastic contact arm of the third ground terminal defines a third through hole;

the third ground sheet comprises a third base portion; the third base portion comprises a fifth engaging portion in contact with the second fixing portion of the third ground terminal and a sixth engaging portion in contact with the second fixing portion of the fourth ground terminal; the third grounding elastic arm is at least partially inserted into the third through hole; the third grounding elastic arm comprises a third abutting portion;

the second contact portion of the second elastic contact arm of the third ground terminal and the third abutting portion of the third grounding elastic arm are disposed at intervals along the mating direction; the second contact portion of the second elastic contact arm of the third ground terminal and the third abutting portion of the third grounding elastic arm are configured to be in contact with a third ground conductive pad of the first mating module.

20. The electrical connector according to claim 19, wherein the third grounding elastic arm comprises a third end portion connected to the third abutting portion, and the third end portion passes through the third through hole.

* * * * *